Figure 1:
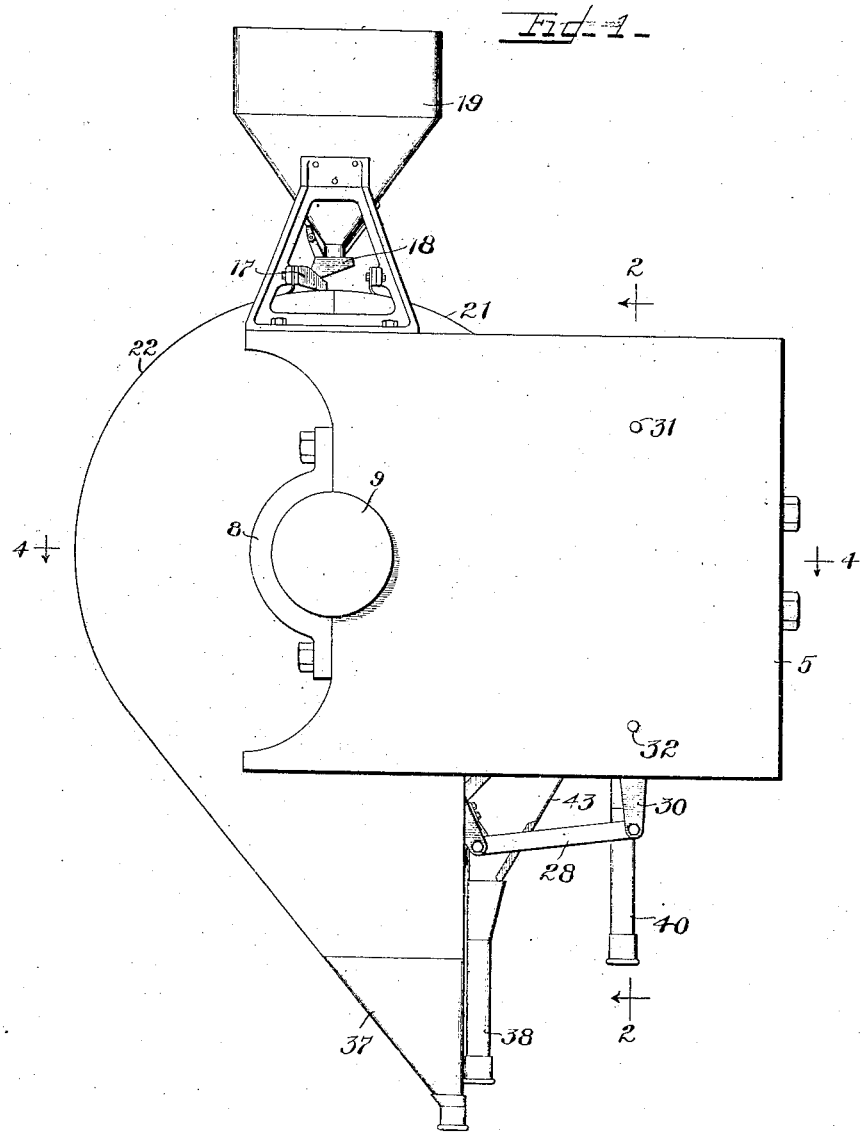

No. 823,303. PATENTED JUNE 12, 1906.
F. T. SNYDER.
MAGNETIC SEPARATOR.
APPLICATION FILED DEC. 1, 1902.

SHEETS—SHEET 1.

Witnesses
Charles J. Schmidt.
Leonard W. Noxander.

Inventor
Frederick T. Snyder.
By Charles A. Brown
Attorney

No. 823,303. PATENTED JUNE 12, 1906.
F. T. SNYDER.
MAGNETIC SEPARATOR.
APPLICATION FILED DEC. 1, 1902.

4 SHEETS—SHEET 2.

Witnesses:

Inventor
Frederick T. Snyder
By Charles A. Brown
Attorney

No. 823,303. PATENTED JUNE 12, 1906.
F. T. SNYDER.
MAGNETIC SEPARATOR.
APPLICATION FILED DEC. 1, 1902.

4 SHEETS—SHEET 4.

Witnesses
Lynn A. Williams
Leonard W Novander

Inventor
Frederick T. Snyder
By Charles A. Brown
Attorney

UNITED STATES PATENT OFFICE.

FREDERICK T. SNYDER, OF OAK PARK, ILLINOIS, ASSIGNOR, BY MESNE ASSIGNMENTS, TO INTERNATIONAL SEPARATOR COMPANY, OF CHICAGO, ILLINOIS, A CORPORATION OF NEW JERSEY.

MAGNETIC SEPARATOR.

No. 823,303.      Specification of Letters Patent.      Patented June 12, 1906.

Application filed December 1, 1902. Serial No. 133,393.

*To all whom it may concern:*

Be it known that I, FREDERICK T. SNYDER, a citizen of the United States, residing at Oak Park, in the county of Cook and State of Illinois, have invented a certain new and useful Improvement in Magnetic Separators, (Case No. 3,) of which the following is a full, clear, concise, and exact description, reference being had to the accompanying drawings, forming a part of this specification.

My invention relates to magnetic separators for the separation of substances of all degrees of magnetic permeability.

Magnetic separators may be generally grouped into two classes, one class including those separators in which permeable materials are separated from non-magnetic materials by causing a change in the direction of motion of the permeable materials as it passes within the influence of a field of magnetic force, the magnetic field remaining stationary. The other class includes those separators in which permeable materials are attracted by and carried with a moving magnetic field or a local flux convergence moving in a magnetic field.

My invention relates to this second class of separators. Among the most efficient separators of this class which have heretofore been constructed are those which utilize a flux convergent toward a projection on the periphery of a rotating cylinder. However, such separators have not been entirely satisfactory on account of mechanical, electrical, or magnetic inefficiencies which it has been difficult to overcome with the types of machine employed.

My invention contemplates the provision of a magnetic separator of greatly-increased mechanical and magnetic efficiency and of decreased cost of construction and subsequent operation.

The invention herein described and claimed is related in some respects to inventions disclosed and claimed in my copending applications, Serial No. 133,006, filed November 28, 1902; Serial No. 133,342, filed December 1, 1902; Serial No. 136,004, filed December 20, 1902, and Serial No. 136,005, filed December 20, 1902.

My invention will be best understood by reference to the accompanying drawings, in which—

Figure 2:
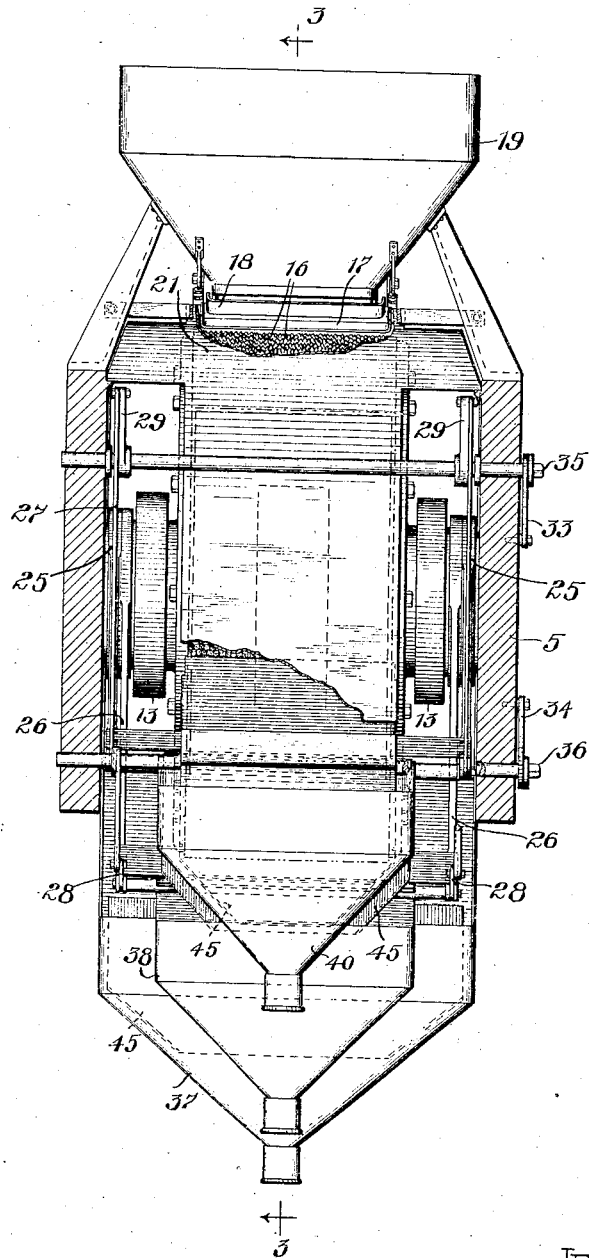
Figure 3:
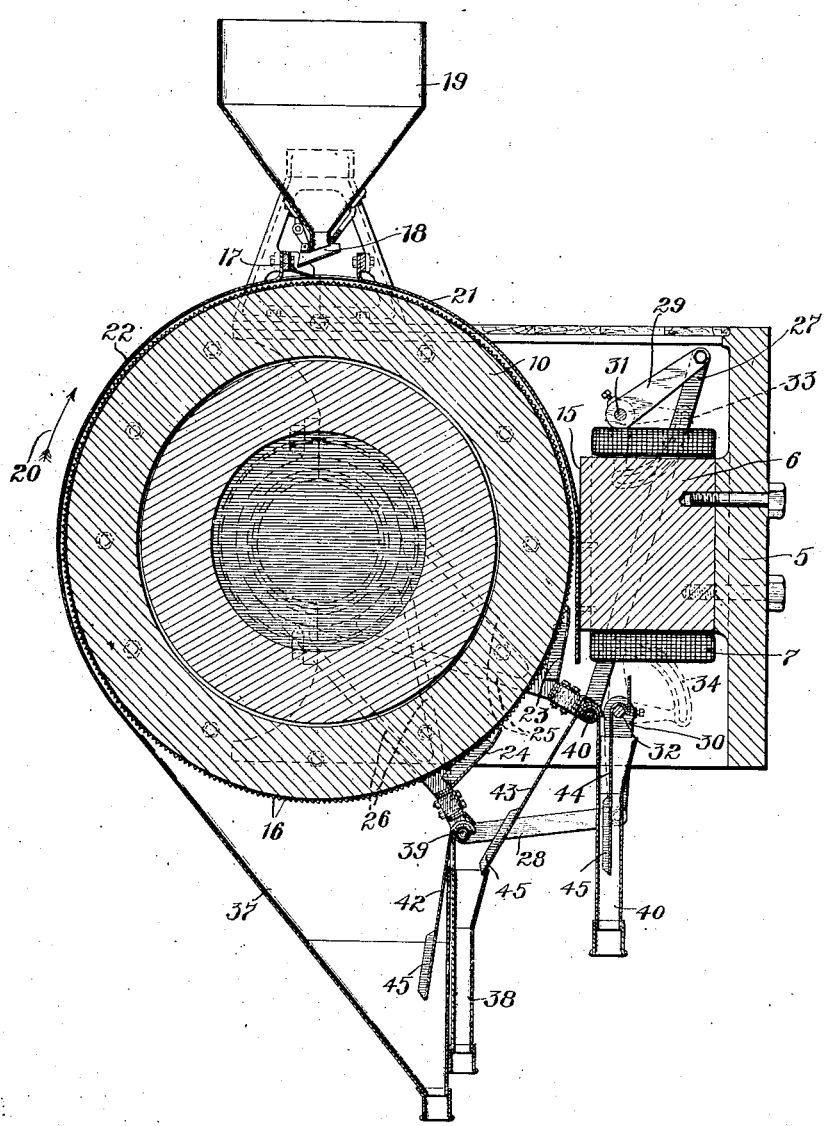
Figure 4:
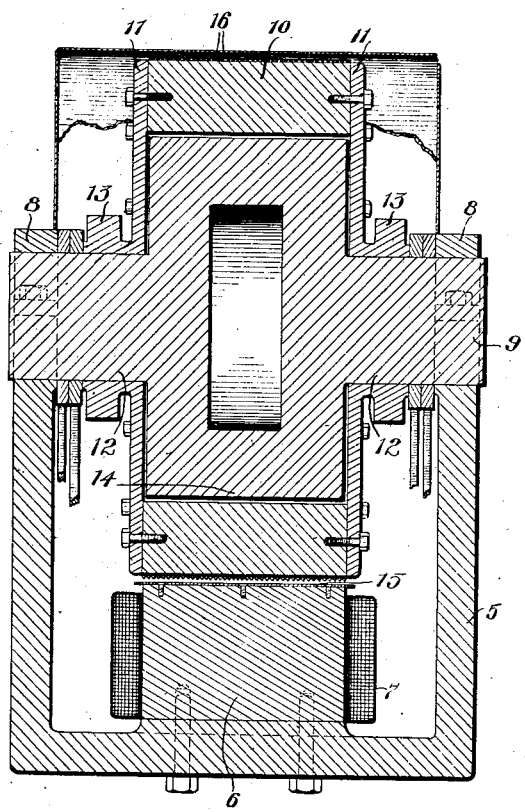

Figure 1 is a side elevation of my improved magnetic separator. Fig. 2 is a vertical sectional view taken on a plane through line 2 2 of Fig. 1. Fig. 3 is a central longitudinal sectional view taken on line 3 3 of Fig. 2. Fig. 4 is a cross-sectional view taken on line 4 4 of Fig. 1, the receiving-hoppers and associated mechanism not being shown.

Like characters of reference indicate like parts throughout the several figures.

In accordance with my invention I provide a field-magnet frame 5, to which is bolted the electromagnet-core 6, this core being wound with an energizing-coil 7. The caps 8 8, adapted to be bolted to the frame 5, serve to retain the cylindrical pole-piece 9 in magnetic and rigid mechanical connection with the frame 5. The cylindrical pole-piece is desirably made hollow in the center in order to lessen its weight. A hollow drum 10, of iron or steel or other highly permeable material, is provided with side flanges 11 11, which are journaled to rotate upon the constricted portions 12 12 of the cylindrical pole-piece 9, each flange being provided with a driving-wheel 13, whereby the magnetic drum 10 may be caused to rotate by any suitable source of power. It will be apparent that the lines of magnetic force set up upon the energization of the coil 7 will pass through the core 6 and will then divide and pass through the arms of the frame 5 to the two ends of the cylindrical pole-piece 9, thence to the pole-face 14, across the air-gap intervening between this pole-face and the interior of the drum 10, through the drum 10 to the air-gap between the exterior of the drum and the pole-face 15 of the core 6. In order to make the magnetic path of as high permeability as possible, the air-gap between the pole-face 14 and the interior of the drum is made as small as practicable. Since magnetic separation is to take place within the field of force between the exterior of the drum and the pole-face 15, this air-gap of low permeability must have some little length.

In magnetic separation the strength with which any particular material is attracted depends upon two factors, one being the density of the flux through the material, the other being the rate of change of density in the direction of attraction. This rate of change of density is commonly referred to in terms of the "convergence" or "divergence" of the lines of force, the permeable material being attracted toward the point of convergence. A flux divergence may be caused by providing in a field of otherwise parallel lines of force a local path of decreased reluctance, such as that provided by a permeable projection locally shortening an air-gap.

Since my improved separator is intended to operate due to the attraction of permeable particles toward the magnetic drum 10, I find it desirable to provide the periphery of such drum with highly-permeable projections such as the permeable teeth 16. The magnetic flux in the air-gap is convergent toward each of the teeth 16. Thus any relatively permeable materials coming within the gap of low permeability between the pole-face 15 and the exterior of the drum are attracted toward the teeth 16.

The material to be separated is fed in an even layer onto the upper surface of the drum by means of the feeding devices 17 and 18, which are supplied from the hopper 19. The drum is rotated in the direction indicated by the arrow 20, whereby the materials fed to the top of the drum are carried around on the surface thereof into the air-gap between the pole-face 15 and the adjacent surface of the drum. A shield 21, preferably of iron or steel, is fastened to the pole-face 15 and carried around parallel with the drum-surface to a point near the feeding devices. This shield prevents material being thrown from surface of the drum, due to centrifugal force or otherwise. A sheet-metal housing 22 is provided to inclose the operating parts of the mechanism.

The operation of the separator is as follows: The coil 7 being energized by an electric current, a magnetic flux is set up through the highly-permeable path between the pole-face 15 and the opposite surface of the drum 10, thus causing a magnetic field in this gap of low permeability. The drum being rotated in the direction indicated, materials are fed to the top of the same, whereby they are carried around toward the line of separation, which is in a horizontal plane passing through the axis of rotation. As they approach this line the divergent fluxes of increasing density from the teeth 16 gradually attract the more permeable materials until when the horizontal plane has been reached these magnetically-attracted materials are firmly held to the projecting teeth. The non-magnetic materials upon reaching the horizontal plane are no longer supported by the drum 10, and as the pole-face 15 and shield 21 lie in a vertical plane below the line of separation these non-magnetic materials are free to fall vertically. Since the pole-face 15 extends a considerable distance below the horizontal line through the axis of rotation of the drum, the magnetic fluxes from the teeth 16 continue until the teeth have passed a considerable distance below the horizontal plane. After the teeth have passed the pole-face 15, forming one boundary of the gap of low permeability, the flux density therefrom is gradually decreased. The drum 10 is desirably rotated at a speed such that the periphery moves at practically the same speed as that of the freely-falling materials after they have passed the point of separation. It will be seen, therefore, that the separation of the permeable from the non-magnetic materials takes place by moving the permeable particles to the side without counteracting their natural tendency to move downward under the force of gravity. As the permeable materials move around on the surface of the drum toward the lowest point thereof the magnetic forces which retain the materials on the surface of the drum act against a continually-increasing componenet of gravity, and as the density of the divergent fluxes is gradually decreased the attracted materials fall from the surface of the drum, the slightly-permeable materials falling first and later the more highly permeable materials. In order to divide the non-magnetic from the permeable materials, and, if desired, to subdivide the permeable class, I provide a series of dividing-plates, such as 23 and 24. These dividing-plates are desirably mounted so as to permit an adjustment thereof concentric with the separating-drum. The dividing-plates are carried on frames 25 and 26, which are rotatably mounted upon the constricted portions 12 of the pole-piece 9. The adjusting-rods 27 and 28, the cranks 29 and 30, the shafts 31 and 32, and the quadrants 33 and 34, connected therewith, serve as a means for adjusting the position of the dividing-plates, while the cap-bolts 35 and 36 provide means for securing the same in adjustment.

I find it desirable to provide a series of telescoping hoppers for the purpose of receiving the separated materials from the drum 10. When two dividing-plates are used, as shown, it is desirable to provide one hopper to receive the non-magnetic material passing to the right of the dividing-plate 23, a second hopper to receive the material passing between the dividing-plates 23 and 24, and a third hopper to receive the material which is deposited after passing the divider 24. The hopper 37 may be rigidly attached to the frame of the machine. The hopper 38 may be suspended from a shaft 39, passing across the carrying-frame 26. A third hopper 40 may be suspended from the shaft 41, passing across the frame 25. Thus when either of the frames 26 or 25 is angularly adjusted about the axis of rotation of the drum the associated hopper will be moved therewith. In order to direct material into the hoppers, no matter what the adjustment of the dividerplates may be I provide aprons 42, 43, and 44, adapted to telescope into the hoppers 37, 38, and 40, respectively. The apron 42 is desirably suspended from the shaft 39, and the apron 43 from the shaft 41, while the apron 44 may be suspended from the shaft 32, which may be conveniently placed for this purpose. The lower corners of the aprons are cut off in order to allow the aprons to slip into the hoppers, and the tapering edges are desirably rolled up. Thus material falling upon the apron is directed toward the center thereof by the walls 45. This feature is useful particularly when the aprons are considerably withdrawn from the hoppers, as shown in Fig. 3. It will be seen that if these edges were not turned up material falling near the sides of the apron would not be directed within the hoppers.

While I have herein shown a particular form of my invention, it will be apperent to those skilled in the art that many modifications therein may profitably be employed without departing from the spirit of my invention, and I therefore do not wish to limit myself to the precise disclosure herein set forth; but, Having described my invention, I claim as new and desire to secure by Letters Patent—

1. In a magnetic separator, the combination with a hollow iron cylinder having permeable projections thereon, of an electromagnet having a pole-piece external to said cylinder and facing the same, the face of said pole-piece being bare, an energizing-winding upon said pole-piece, a body of magnetic material forming a return magnetic circuit from the rear of said pole-piece to the inside of a said hollow cylinder, and means for passing material to be separated between the surface of said hollow cylinder and the face of said pole-piece and into contact therewith.

2. In a magnetic separator, the combination with a hollow iron cylinder mounted to rotate on a horizontal axis, having permeable projections on its outer surface, of a magnet having a central iron core forming one pole thereof, disposed within said hollow cylinder close to the inner surface of said cylinder, and a bare pole-piece of opposite polarity external to said cylinder and facing the outer surface thereof, and an energizing-winding for said magnet external to said cylinder, means for feeding material to be separated upon the upper surface of said cylinder, and means for passing said material into contact with said bare external pole-piece, substantially as set forth.

3. In a magnetic separator, the combination with an electromagnet, of a hollow permeable cylinder included in the magnetic circuit of said magnet, and means for feeding material to be separated to the outer surface of said cylinder, the winding being applied to said electromagnet outside of said cylinder, said magnet having a bare pole adjacent to one side of said cylinder, said pole being formed below the horizontal plane through the axis of the cylinder to lie back of a vertical plane tangent to the cylinder.

4. In a magnetic separator, the combination with an electromagnet, of a hollow permeable cylinder included in the magnetic circuit of the magnet, said magnet having one pole applied to the inside of the cylinder, and a second pole having a bare surface applied to the outside of said cylinder, permeable projections on the surface of said cylinder, means for feeding materials to be separated to the outer surface of said cylinder, and means for passing said materials into contact with the bare pole of the magnet applied to the outer surface of the cylinder.

5. In a magnetic separator, the combination with a cylindrical rotatable armature, permeable projections on the surface of said armature, an electromagnet constituting a frame supporting and inclosing mechanism of the generator, said magnet having poles of opposite polarity and different areas, one located on the inside of said hollow cylinder, the other located outside of the cylinder and having a bare face, the winding of said electromagnet being adjacent the air-gap between the armature and said outer pole, means for feeding materials to be separated to the upper surface of said armature, and means for rotating said armature to pass said materials into contact with said bare outer pole.

6. In a magnetic separator, the combination with a hollow cylindrical armature, of means for rotating said armature about a horizontal axis, an electromagnet having a pole on the inside of said electromagnet, and another pole having a bare face of smaller area on the outside of the magnet approximately on a level with the horizontal axis thereof, the winding of said electromagnet being placed adjacent to said outer pole of lesser area, means for passing materials to be separated between said armature and said pole of lesser area and into contact with the bare face of said pole, and permeable projections on the surface of said armature spaced from said pole of lesser area a distance such that the portion of the material to be separated may be attracted from said pole to said projections.

7. In a magnetic separator, the combination with a hollow cylindrical armature, of means for rotating said armature about a horizontal axis, an electromagnet having a pole located on the interior of said hollow cylindrical armature, and a pole having a bare face of lesser area than said internal pole located on the outside of said cylindrical armature facing the same, the winding of said electromagnet being provided upon said outer pole, means for passing materials to be separated between said armature and said outer pole, and permeable projections formed on the surface of said armature, said projections being of such shape and spaced from said outer pole a distance such that a portion of the materials to be separated may be attracted from said pole to said projections.

8. In a magnetic separator, the combination with a hollow cylindrical armature, of means for rotating said armature about a horizontal axis, an electromagnet having poles of opposite polarity and of different areas, the larger poles being located on the interior of the hollow armature and the pole of lesser area being located approximately on a level with the horizontal axis of the armature and on the outside thereof, the winding of the electromagnet being adjacent to the air-gap between the armature and the pole of lesser area, means for passing materials to be separated between said armature and said pole of lesser area and into contact with said pole, triangular pyramids in staggered rows formed on the surface of said armature, said projections being of such shape and spaced from said pole of lesser area such a distance that the portion of the materials to be separated may be attracted from said pole to said projections, and a divider interposed between attracted and non-attracted materials at a point where the direction of the force of attraction is substantially perpendicular to the force of gravity.

9. In a magnetic separator, the combination with a hollow cylindrical armature, of means for rotating said armature about a horizontal axis, an electromagnet having poles of opposite polarity and of different areas, the larger pole being located on the inside of said cylindrical armature and the pole of lesser area being located outside of said armature approximately on a level with the horizontal axis of rotation thereof, the winding of said electromagnet being applied adjacent to the air-gap between the armature and the pole of lesser area, means for passing materials to be separated between the armature and said pole of lesser area and into contact with the bare face of said pole, permeable projections on the surface of said armature spaced from the pole of said lesser area such a distance that a portion of the materials to be separated may be attracted from said pole to said projections, and a divider interposed between attracted and non-attracted material at a point where the direction of the force of attraction is substantially perpendicular to the direction of the force of gravity, said pole of lesser area being formed to permit the free fall of materials not attracted.

10. In a magnetic separator, the combination with a hollow cylindrical armature, of means for rotating said armature about a horizontal axis, an electromagnet having poles of opposite polarity, one located on the inside of said hollow cylindrical armature and the other located on the outside thereof, the winding of the electromagnet being adjacent to the air-gap between the armature and the pole located on the outside thereof, means for passing materials to be separated between said armature and the pole on the outside thereof and into contact with the bare face of said pole, triangular pyramidal projections in staggered rows, said projections being of such shape and spaced from said pole on the outside of said armature such a distance that the portion of the materials to be separated may be attracted from said pole to said projections, and a divider interposed between attracted and non-attracted materials at a point where the direction of the force of attraction is substantially perpendicular to the force of gravity, said pole on the outside of the armature being formed to permit the free fall of materials not attracted.

11. In a magnetic separator, the combination with a hollow iron cylinder mounted to rotate on a substantially horizontal axis, of a magnet-pole facing the inner side of said cylinder, a second magnet-pole of opposite polarity facing the outside of said cylinder, the face of said outer pole being vertical below a horizontal plane through the axis of said cylinder, permeable projections upon the cylinder, a divider-plate on the under side of said cylinder and separated from the surface thereof a distance sufficient to permit the passage of attracted material past its edge, the edge of said divider being located just inside a vertical tangent to said cylinder, means for feeding materials to be separated to the upper surface of said cylinder, and means for rotating said cylinder to pass materials through the gap between the cylinder and the external pole-piece.

In witness whereof I hereunto subscribe my name this 28th day of November, A. D. 1902.

FREDERICK T. SNYDER.

Witnesses:
LYNN A. WILLIAMS,
HARVEY L. HANSON